Nov. 21, 1950           D. F. ALEXANDER          2,530,931

DETONATION INDICATING APPARATUS

Filed Jan. 27, 1945                             2 Sheets-Sheet 1

INVENTOR.
Donald F. Alexander
BY
His Attorneys.

Nov. 21, 1950  D. F. ALEXANDER  2,530,931
DETONATION INDICATING APPARATUS
Filed Jan. 27, 1945  2 Sheets-Sheet 2

INVENTOR.
Donald F. Alexander.
BY Spencer, Hardman & Fehr,
His Attorneys

Patented Nov. 21, 1950

2,530,931

UNITED STATES PATENT OFFICE 2,530,931

DETONATION INDICATING APPARATUS

Donald F. Alexander, Oakwood, Ohio, assignor to General Motors Corporation, Dayton, Ohio, a corporation of Delaware Application January 27, 1945, Serial No. 574,963

5 Claims. (Cl. 177—311)

1

This invention relates to aeronautical apparatus and more particularly to an arrangement for giving an indication of undesirable detonations occurring in an airplane engine.

It has long been recognized that a small amount of fuel "knock" or detonation at infrequent intervals does not cause appreciable damage to an engine but that excessive detonation can destroy an engine in a short time, sometimes after only one or two detonations. Destructive detonation frequently occurs in aerial combat, for example, when a pilot tries to force an engine beyond its safe limit.

It is an object of this invention to provide a device for giving a definite indication to the pilot of undesirable detonation so as to avoid engine failure.

It is another object of this invention to provide a detonation indicator which is simple and inexpensive and at the same time reliable.

A further object of this invention is to provide an indicator of the type which will either flash a light, give a sound indication, or both.

More particularly, it is an object of this invention to provide an indicator in which the light flashes at a substantially fixed intensity and in which the severity of the detonations determines the rate of flashing.

Still another object of this invention is to provide an electric circuit including means for preventing sudden voltage variations in the power supply circuit from causing unwanted disturbances in certain parts of the circuit.

Another object of this invention is to provide automatic means for compensating for variations in the voltage supply in an electronic circuit.

Further objects and advantages of the present invention will be apparent from the following description, reference being had to the accompanying drawings, wherein a preferred form of the present invention is clearly shown.

For purposes of illustration, I have shown a detonation indicator of the type suitable for use in an Allison type of airplane engine. However, it is within the purview of this invention to use an indicator of the type disclosed herein on other types of engines.

Figure 1:
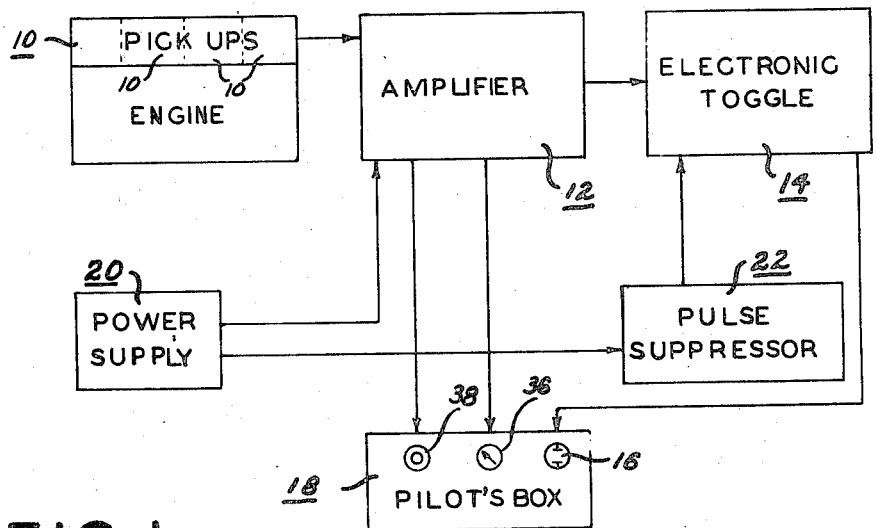
Fig. 1 is a block diagram showing the main elements of the destructive detonation indicator set forth herein.

Referring now to Fig. 1 wherein there is shown a block type of diagram, each reference numeral 10 designates an electrodynamic pick-up unit mounted in the head of one of the cylinders of the engine for detecting the detonations. Electrodynamic pick-ups of this type are now well known and need no further description. There are several types of pick-ups now available, any one of which may be used in the system described herein. In the case of an Allison engine, the required number of pick-up units would be provided and these pick-up units would be connected into the circuit in parallel relationship as shown with the result that detonation in any one or more of the cylinder heads would operate to give a signal. For purposes of illustration I have shown four pick-up units. The detonations produce discontinuous recurrent sinusoidal wave pulses of established decrement which are picked up by the units 10 and transmitted to the amplifier 12.

Figure 2:
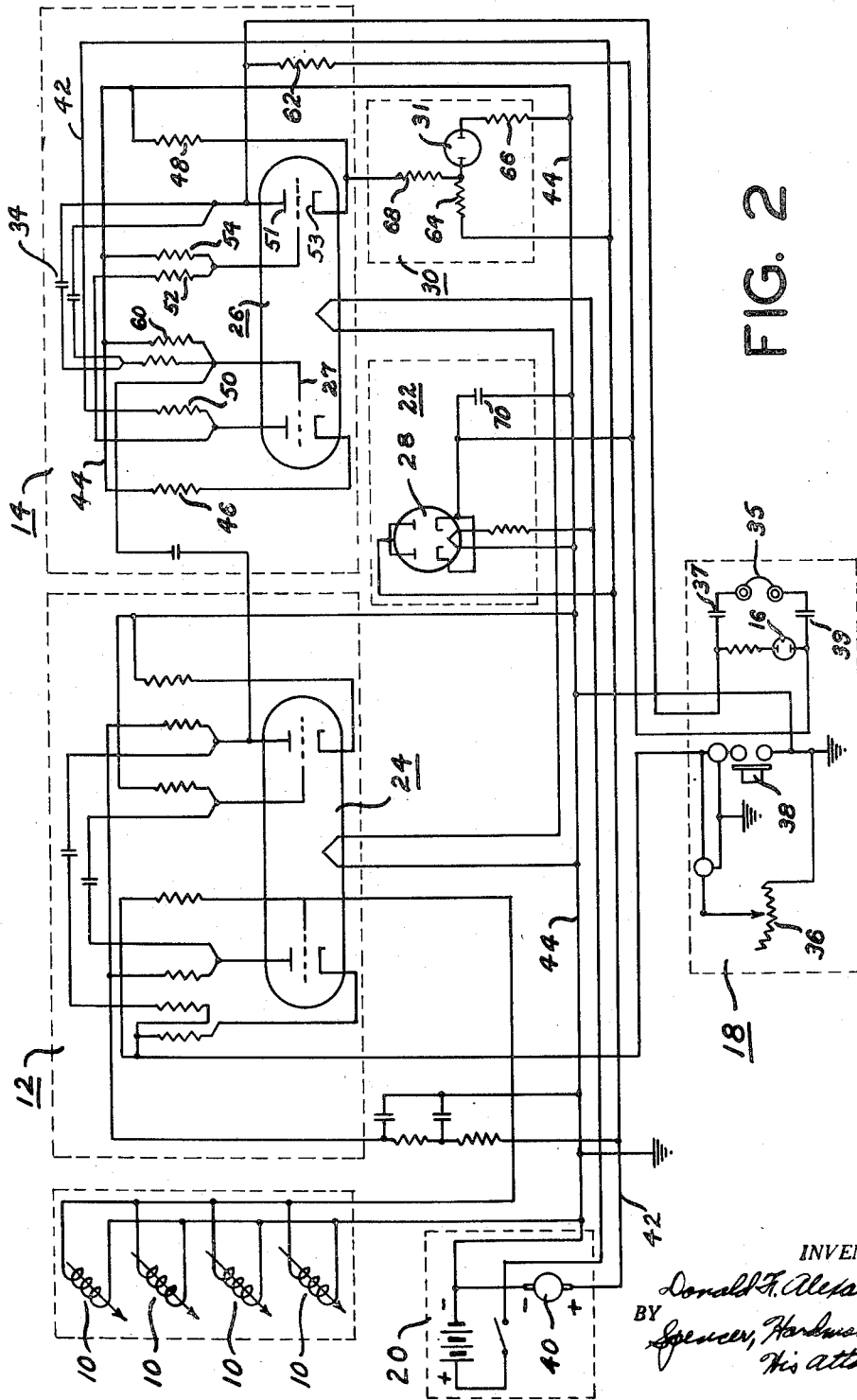
Fig. 2 is a wiring diagram showing the circuits used in the indicator.

The amplifier 12 is a small compact unit using one dual triode tube arranged in the circuit as shown in Fig. 2 and has an adjustable gain control 36. The amplifier 12 is connected to an electronic toggle 14 which operates one or more signalling devices such as the flasher tube 16 mounted in the pilot's box 18 located in full view of the pilot. The tube 16 is a conventional gas filled tube, such as a neon tube.

The electronic toggle 14 operates the flasher 16 only at such times when the peak signal received from the amplifier 12 exceeds a predetermined value. In other words, whenever the peak signal exceeds a predetermined value, the signal voltage trips the electronic toggle so as to light up the flasher 16 or other signalling device as will be explained more fully hereinafter. Reference numerals 20 and 22 designate a conventional power supply and a pulse suppressor, respectively.

Referring now to Fig. 2 wherein a detailed wiring diagram has been shown, reference numeral 24 designates a conventional dual triode which forms a part of the amplifier designated by the reference numeral 12 in the block diagram shown in Fig. 1. While I have shown a dual triode type of tube, it is obvious that two separate triode or pentode tubes could be used. The main reason for using a dual triode tube is to improve the reliability and reduce the number of tubes required so as to conserve on space and reduce the number of replacement parts which must be carried in stock. A similar dual-triode tube 26 forms a part of the electronic toggle which has been designated by the reference numeral 14 in the block diagram shown in Fig. 1.

A pulse suppressor 28 has been added in the circuit so as to prevent sudden variations in the high-voltage supply circuit from causing false indications by the indicator device. A voltage compensator 30 is also used for altering the voltage from the cathode to ground with respect to the high-voltage supply circuit in such a manner as to require a constant input signal to trip the electronic toggle over a wide range of voltages. The compensator 30 includes a voltage regulator tube 31 which may be identical to the flasher tube 16 and which is connected in the circuit as shown in Fig. 2.

Figure 3:
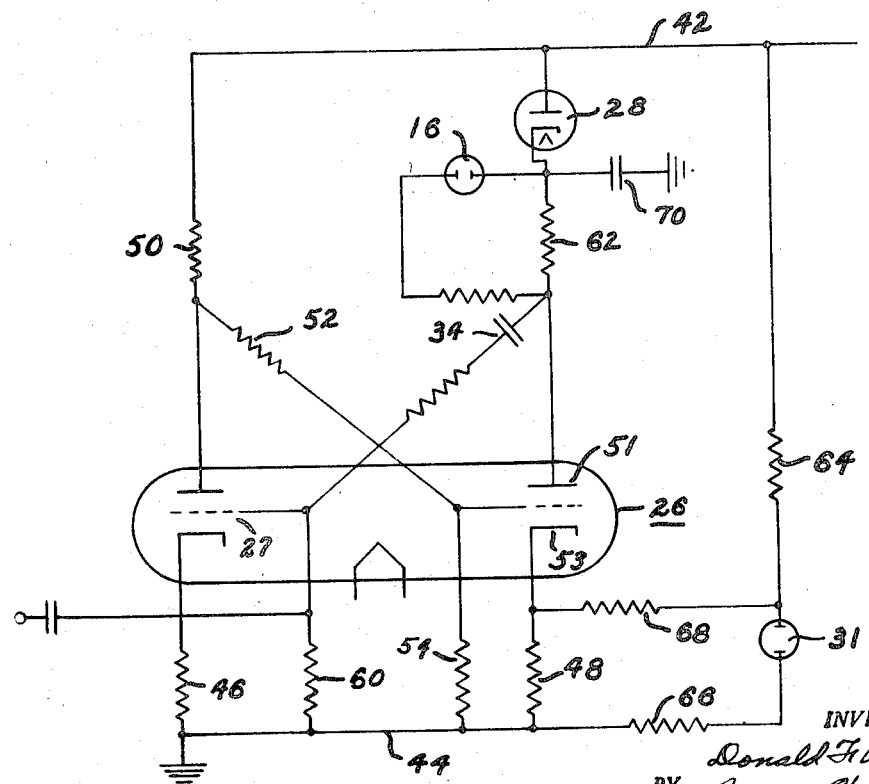
Fig. 3 is a schematic diagram showing the electronic toggle, pulse suppressor, voltage compensator, and the flasher for giving the indication.

In Fig. 3 of the drawing, there is shown a schematic diagram of the electronic toggle, pulse suppressor, voltage compensator, and the flasher.

As shown in this schematic diagram, the tube 26 is a dual triode tube, although pentodes could be used in place of triodes without a change in the basic operating features. The signal and result triode sections of the tube 26 are associated electrically to obtain the desired toggle operation. The input signal in the form of negative wave pulses is connected to the grid 27 of the first or signal triode, and the indicating flasher tube 16 is connected in the plate circuit of the second or result triode in the manner shown. Both triodes obtain their anode voltages from a common supply unit 40 (Fig. 2), the positive side of which is connected to the power supply line 42 as shown on the diagram and the negative side is connected to the grounded line 44. The power supply unit 40 may, for example, comprise a 300 volt direct current generator.

The stages are coupled together by a resistor-capacitor combination to produce the desired results. In the absence of input signal, the first stage of the toggle conducts a steady current in accordance with a grid-cathode bias established by the flow of this current through cathode resistor 46. At this time, the second stage is prevented from carrying current by suitable choice of voltages appearing on the grid and cathode respectively. The cathode voltage is established positive with respect to ground by the flow of bleeder current through cathode resistor 48. The grid is established at a lower voltage than the cathode with respect to ground by suitable choice of three resistors 50, 52 and 54. The net bias for the second stage is approximately 12 to 14 volts at this time.

Upon receipt of a signal having sufficient negative half-wave amplitude, the grid bias of the first or signal stage of the toggle momentarily increases, reducing the plate current flow through the anode and the stage. This current flows through resistor 50 and therefore an increase in voltage results at the junction of resistors 50 and 52. This increase in voltage is communicated in a definite proportion to the grid of the second or result stage. At a certain critical value of this increase in voltage, the second or result stage permits a small flow of current from anode 51 to cathode 53. This small flow of current passing from the line 42 to the anode 51 creates a voltage drop through the resistive elements in the circuit and the anode voltage on the second or result stage decreases slightly. The capacitor 34, previously charged to the voltage in line 42, therefore partially discharges. The discharge current flows from ground through grid resistor 60, reinforcing the original effect of the signal on the grid of the first or signal stage, i. e., further tending to cut off the plate current to the first stage. The effect is cumulative and instantaneous, so that the first stage becomes totally non-conductive and the second stage becomes totally conductive. The indicating light 16 breaks down to indicate the passage of current through resistor 62. This condition continues until the capacitor 34 is discharged sufficiently, whereupon the current flow through the resistor 60 ceases and the first stage of the toggle again becomes conducting in the absence of further signals at the input. The above process then becomes reversed, so that the second stage again resumes a net bias to cut off the flow of current through the second stage. The capacitor 34 becomes recharged to full voltage corresponding to the voltage in line 42, and the signal light 16 is extinguished.

The function of the resistors 64, 66 and 68, in conjunction with the neon filled voltage regulator tube 31 is to provide a suitable cathode voltage on the second stage of the toggle with respect to ground and in the absence of a signal, so that the amplitude of signal required to trip the electronic toggle is essentially independent of the voltage on line 42 within a wide range such as 200 to 300 volts.

The function of the rectifier tube 28 and the storage capacitor 70 is to prevent false indication of the signal light 16 due to sudden fluctuations of the supply voltage on line 42. These false indications result particularly in the absence of the rectifier tube 28 and the storage capacitor 70, when the voltage on line 42 drops. This permits a partial discharge of capacitor 34, an increase in the negative bias on the first stage, and an operation of the toggle exactly as though a signal had been received at the input of the device. The rectifier tube 28 and the storage capacitor 70 effectively prevent such false operation, since the rectifier blocks any attempt of capacitor 34 to discharge except through its normal circuit via anode to cathode of the second stage of the electronic toggle. The capacitor 70 provides a storage tank of electrical energy sufficiently large with respect to the capacitor 34 that any voltage change at the junction of the rectifier tube 28 and the resistor 62 is minimized.

By virtue of the circuit arrangement used, the flashing light is always of the same intensity and any variation in the intensity of the detonations above the value at which the toggle operates causes a change in the rate of flashing. Thus, the stronger the signal received by the toggle, the quicker the feedback storage capacitor stores up the necessary charge to trip the toggle.

Referring again to Fig. 2 of the drawings, a gain control 36 has been provided. The gain control 36 is of the adjustable feedback type of gain control regulator and serves its usual well known function which needs no further description. A push button switch 38 is used for test purposes. As shown by the circuit in Fig. 2, closing of the push button switch 38 serves to change the sensitivity of the circuit so that ordinary engine noise will cause flashing of the signal light 16. By virtue of this arrangement, it is possible to determine if the tubes and other parts of the indicating circuit operate satisfactorily merely by closing the test push button switch 38 when the engine is operating even though it is not detonating.

While the preferred type of signal is that of a flashing light, it may also be desirable under certain circumstances to include head phones such as the head phones 35 in addition to the flasher light 16 or in place of the light 16, for giving an audible signal to the pilot. The audible signal would be that of a clicking noise. The usual condensers 37 and 39 are arranged in series with the head phones 35 as shown.

While the form of embodiment of the invention as herein disclosed constitutes a preferred form, it is to be understood that other forms might be adopted, as may come within the scope of the claims which follow.

What is claimed is as follows:

1. An electronic toggle circuit which is self-restoring in the absence of an impulse including vacuum tube means having signal and result groups of elements each including a cathode and an anode and a grid, power supply means connected to each anode and cathode, a single series capacitive connection constituting the only effective electrical connection connecting the anode of the result group with the grid of the signal group, a single resistance connection constituting the only effective electrical connection connecting the grid of said result group with the anode of the signal group, means for normally biasing the grid of said result group beyond plate current cut-off, a gas-filled tube connected to said power supply means and to the anode of the result group to which said capacitor is connected to provide a flash signal in response to the plate current of said anode, and means for applying negative wave pulses to the grid of said signal group to reduce its plate current flow and to momentarily reduce the bias of the grid of said result group to initiate plate current flow therein.

2. A self-restoring electronic toggle circuit including vacuum tube means having signal and result groups of elements each including a cathode and an anode and a grid, power supply means connected to each anode and cathode, a single series capacitive connection constituting the only effective electrical connection connecting the anode of the result group with the grid of the signal group, a single wholly resistance connection constituting the only effective electrical connection connecting the grid of said result group with the anode of the signal group, means for normally biasing the grid of said result group beyond plate current cut-off, a gas-filled tube connected to said power supply means and to the anode of the result group to which said capacitor is connected to provide a flash signal in response to the plate current of said anode, means for applying negative wave pulses to the grid of said signal group to reduce its plate current flow and to momentarily reduce the bias of the grid of said result group to initiate plate current flow therein, and a rectifier tube connected in series with the connection between the gas-filled tube and the power supply.

3. An electronic circuit including vacuum tube means having signal and result groups of elements each including a cathode and an anode and a grid, power supply means connected to each anode and cathode, a single series capacitive connection constituting the only effective electrical connection connecting the anode of the result group with the grid of the signal group, a single resistance connection constituting the only effective electrical connection connecting the grid of said result group with the anode of the signal group, means for normally biasing the grid of said result group beyond plate current cut-off, a gas-filled tube connected to said power supply means and to the anode of the result group to which said capacitor is connected to provide a flash signal of uniform intensity in response to the plate current of said anode, a capacitor connected to one element of said gas filled tube, and means for applying negative wave pulses to the grid of said signal group to reduce its plate current flow and to momentarily reduce the bias of said result group to initiate plate current flow therein.

4. An electronic circuit including vacuum tube means having signal and result groups of elements each including a cathode and an anode and a grid, power supply means connected to each anode and cathode, means providing a bias above cut-off in the signal group for maintaining a plate current through the signal group and providing a cut-off bias upon the grid of the result group for cutting off the plate current of the result group at all times in the absence of any signal including a single series capacitive coupling connecting the anode of the result group with the grid of the signal group and a resistance coupling connecting the anode of the signal group with the grid of the result group, means for applying a signal of negative pulses to the grid of the signal group and a gas-filled flasher tube connected between the anode of the result group and the power supply means to provide a visible signal of substantially uniform intensity in response to the plate current of the result group.

5. An electronic circuit including vacuum tube means having signal and result groups of elements each including a cathode and an anode and a grid, power supply means connected to each anode and cathode, means providing a bias above cut-off in the signal group for maintaining a plate current through the signal group and providing a cut-off bias upon the grid of the result group for cutting off the plate current of the result group at all times in the absence of any signal including a single series capacitive coupling connecting the anode of the result group with the grid of the signal group and a resistance coupling connecting the anode of the signal group with the grid of the result group, a gas-filled flasher tube connected between the anode of the result group and the power supply means to provide a visible signal of substantially uniform intensity in response to the plate current of the result group, and a rectifier tube connected in series with the connection between the flasher tube and the power supply means.

DONALD F. ALEXANDER.

REFERENCES CITED

The following references are of record in the file of this patent:

UNITED STATES PATENTS

| Number | Name | Date |
| --- | --- | --- |
| 1,461,790 | Sultzer | July 17, 1923 |
| 1,907,415 | Carpenter et al. | May 2, 1933 |
| 2,258,943 | Bedford | Oct. 14, 1941 |
| 2,265,868 | Schnoland | Dec. 9, 1941 |
| 2,269,760 | Eldredge | Jan. 13, 1942 |
| 2,275,675 | Draper et al. | Mar. 10, 1942 |
| 2,291,045 | Lancor, Jr. | July 28, 1942 |
| 2,305,845 | Cockerell | Dec. 22, 1942 |
| 2,337,522 | Eldredge | Dec. 21, 1943 |
| 2,348,016 | Michel | May 2, 1944 |
| 2,373,750 | Faulkner | Apr. 17, 1945 |
| 2,395,902 | Nisewanger et al. | Mar. 5, 1946 |
| 2,404,047 | Flory et al. | July 16, 1946 |
| 2,406,096 | Morrison | Aug. 20, 1946 |
| 2,425,315 | Atwood et al. | Aug. 12, 1947 |
| 2,430,725 | Miller et al. | Nov. 11, 1947 |
| 2,432,204 | Miller | Dec. 9, 1947 |

OTHER REFERENCES

RCA Review, July 1940, page 57.